H. L. STILLMAN.
ALAEPLANE.
APPLICATION FILED MAR. 12, 1910.
1,011,519.
Patented Dec. 12, 1911.
2 SHEETS—SHEET 1.
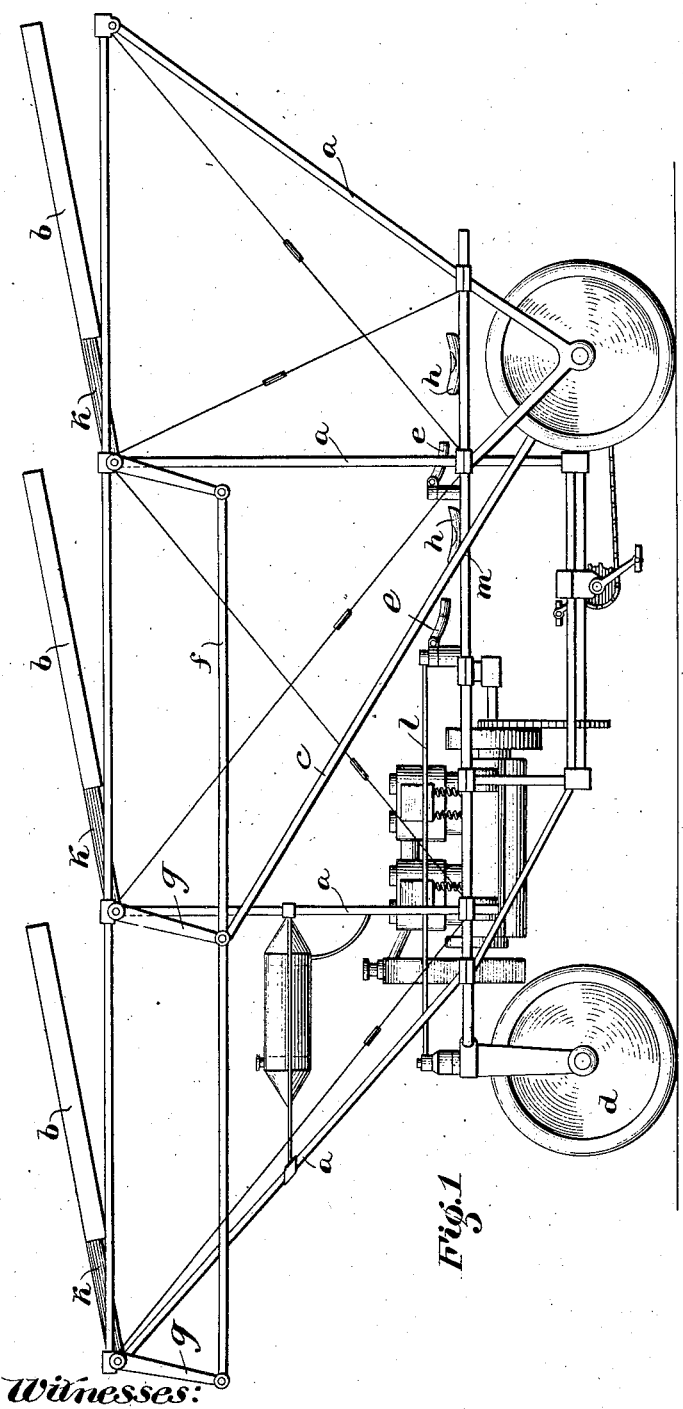
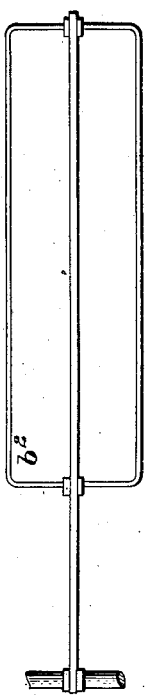
Witnesses:
Inventor:

H. L. STILLMAN.
ALAEPLANE.
APPLICATION FILED MAR. 12, 1910.
1,011,519.
Patented Dec. 12, 1911.
2 SHEETS—SHEET 2.
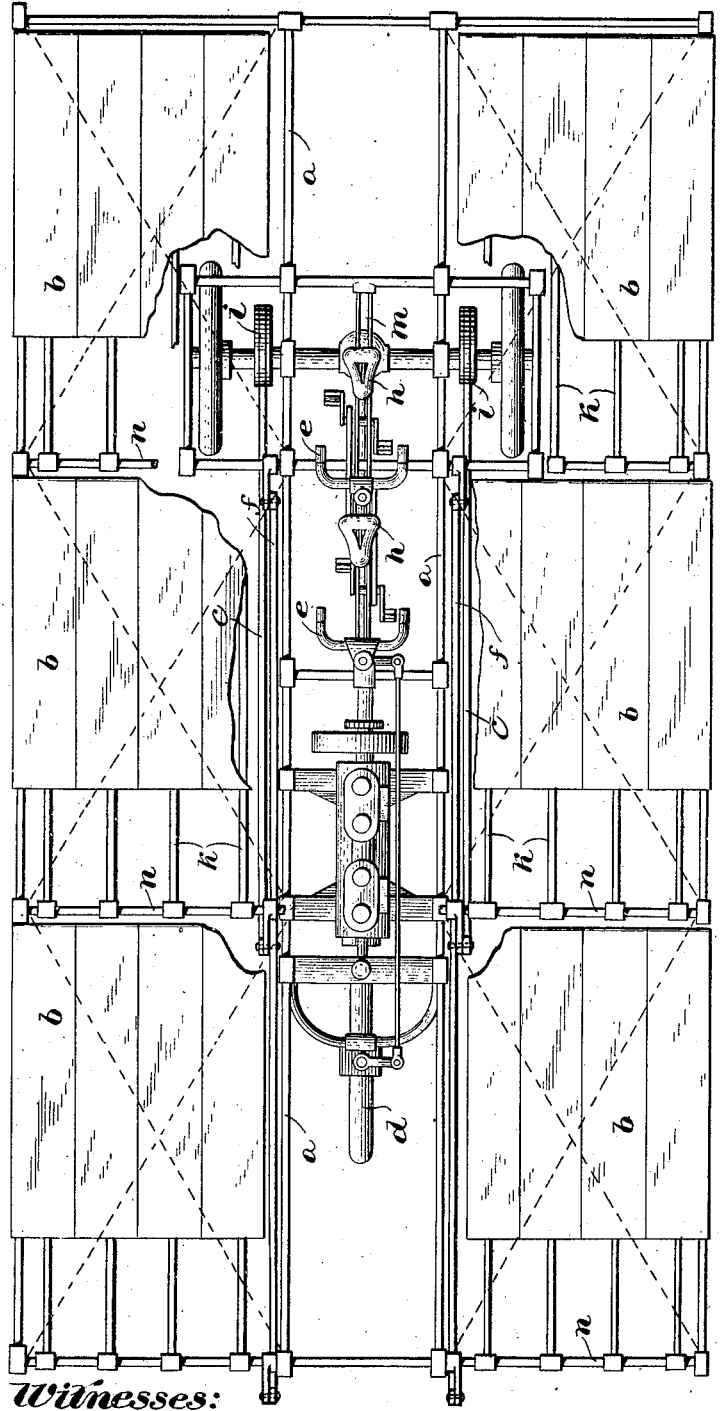
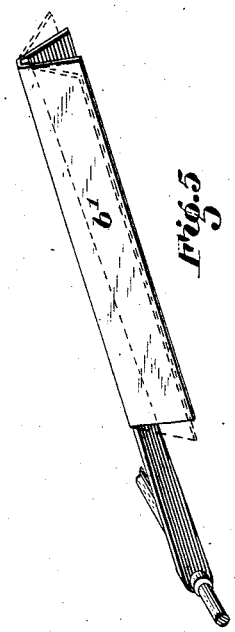
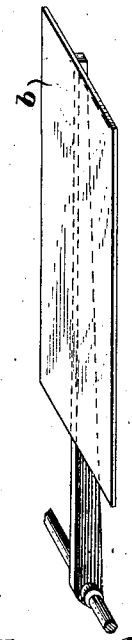
Witnesses:
Inventor:
Herbert L. Stillman

UNITED STATES PATENT OFFICE.

HERBERT L. STILLMAN, OF WESTERLY, RHODE ISLAND.

ALAEPLANE.

1,011,519.  Specification of Letters Patent.  Patented Dec. 12, 1911.

Application filed March 12, 1910. Serial No. 549,039.

*To all whom it may concern:*

Be it known that I, HERBERT L. STILLMAN, a citizen of the United States, residing at Westerly, in the county of Washington and State of Rhode Island, have invented a certain new and useful Improvement in Alaeplanes, of which the following is a specification.

This invention relates to a multiple winged flying machine having wings so arranged that they serve both as a sustaining plane surface, and also as a means of propulsion; this being accomplished in the manner shown in the accompanying drawings.

It will be apparent that the particular form of construction shown may be altered, without departing from the principle of the invention, which may be understood by referring to the drawings and the following description of the same.

Figure 1, is a side view of a complete machine. Fig. 2 is a plan view of the same machine, with part of the wings omitted, in order to clearly show the car or chassis underneath. A number of the side wings are shown broken away for the same reason. Figs. 3, 4 and 5 show details of one of the wings and the accompanying mechanism.

Returning to an examination of Fig. 1, (a) indicates the tubular frame work of the machine; (b) the planes or wings; (c) the upper part of wing working rods; (d) the steering wheel; (e) the steering handles; (h) shows movable seats.

In operation, it is intended to combine foot power with a gasolene motor in beginning an ascent or in descending, or at other times as may be necessary. Both motor and foot power drive the rear wheels of the machine, combined or independent action being secured by means of the well known "coaster-brake" as used in motor bicycles.

Mounted on the rear wheels is an eccentric (i) or similar device for transmitting motion to the wings through the working rods (c) so that the wings are operative at all times whether machine is in the air or on the ground, this being an advantage in beginning an ascent or in alighting after a flight.

The seats (h) are arranged to slide back and forth on slides (m) so that the center of load may be varied in order to balance or otherwise control the machine.

The steering wheel (d) is constructed of two aluminum plates, suitably fastened and having a rubber tire on the rim thereof. This wheel is intended to act as a rudder while in the air as well as a steering wheel while on the ground. This steering wheel is connected with the steering handles (e) by the reach rod (l).

Mounted on top of the framework (a) and reaching across the machine are work shafts (n) journaled in suitable journals at the top of each upright frame member. At the ends of these work shafts are levers (g) pivoted to a connecting rod (f) which transmits motion to all three work shafts simultaneously from the diagonal working rod (c). Keyed to these work shafts are the wooden "spines" (k) Figs. 2 and 3, suitably bushed, and having attached to them a hinged wire frame (o) Fig. 3 to which the wing surfaces ($b^1$), composed of suitable fabric, may be attached by lacing, or other suitable means, the whole constituting the wing, which is the essential feature of my invention. In detail, this wing and the manner of its working is shown more clearly in Figs. 3, 4 and 5.

In Fig. 3, the wooden "spine" is shown in three positions, with a portion of the work shaft attached, and the wire frame also.

In Fig. 4, the wing is shown with the cover on, and as it appears at the end of its downward stroke. Fig. 5 shows the position of the wing at the end of its upward movement, the dotted lines indicating what may be the position of the wings at the beginning of the next downward stroke.

The action of a single wing being understood, it will be clear that this invention embodies an entirely new principle in flying machines; *i. e.* the collapsing wing feature, in which the rapid movement in a downward and rearward direction results in an automatic opening and closing of the wing, by reason of the variation in the pressure exerted by the air on the under surface, or the upper surface of the wing, as the case may be, during upward and downward movement. The resultant effect of the rapid opening and closing of a multiple number of wings constructed as shown, is a lifting and at the same time a pushing forward of the machine.

Herein lies the difference between my invention and the other devices which have been invented for the purpose. In my invention, aside from the source of power, or the manner of transmitting the same, to the wings, the actual operation of the wings themselves is automatic, while so far as is known all other devices using movable wings also depend on mechanical means to open and close them, as well as work them up and down.

It will thus be seen that in the foregoing device rapidity and a steady movement is obtained, thereby securing speed and safety in flight and ordinary accidents are largely avoided.

Having described my invention, I claim—

An aerial machine comprising an open main frame, spaced pivoted wings mounted on transverse axes on said main frame, a motor, connections between said motor and wings whereby said wings are oscillated from their uppermost positions with a downward and backward stroke, each of said wings comprising a pair of pivoted flaps which automatically open and close on their downward and upward strokes, respectively.

HERBERT L. STILLMAN.

Witnesses:
FRANK H. ALLEN,
MADELINE D. RITCHIE.